US007020847B1

(12) United States Patent
Holzheuer

(10) Patent No.: US 7,020,847 B1
(45) Date of Patent: Mar. 28, 2006

(54) SEARCH AND NAVIGATION DEVICE FOR HYPERTEXT DOCUMENTS

(75) Inventor: Heiko Holzheuer, Salzkotten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/369,360

(22) Filed: Aug. 6, 1999

(30) Foreign Application Priority Data

Mar. 9, 1999 (DE) ................................ 199 10 357

(51) Int. Cl.
*G09G 5/00* (2006.01)
(52) U.S. Cl. ........................ 715/855; 715/763; 345/441
(58) Field of Classification Search ................ 345/744, 345/745, 853–855, 441, 440; 707/5, 102, 707/104.1; 715/763, 855, 744, 745, 848, 715/853, 762, 765
See application file for complete search history.

(56) References Cited

U.S. PATENT DOCUMENTS

| | | | | |
|---|---|---|---|---|
| 5,021,976 A | * | 6/1991 | Wexelblat et al. | 345/853 |
| 5,515,488 A | * | 5/1996 | Hoppe et al. | 345/440 |
| 5,636,350 A | * | 6/1997 | Eick et al. | 345/440 |
| 5,778,363 A | * | 7/1998 | Light | 707/5 |
| 5,832,494 A | * | 11/1998 | Eggert et al. | 707/102 |
| 5,855,015 A | * | 12/1998 | Shoham | 707/5 |
| 5,895,470 A | * | 4/1999 | Pirolli et al. | 707/102 |
| 5,911,138 A | * | 6/1999 | Li et al. | 707/3 |
| 6,067,552 A | * | 5/2000 | Yu | 707/501.1 |
| 6,088,032 A | * | 7/2000 | Mackinlay | 345/848 |
| 6,216,134 B1 | * | 4/2001 | Heckerman et al. | 707/104 |

OTHER PUBLICATIONS

Craven et al, "Learning to Extract Symbolic Knowledge from the World Wide Web," School of Computer Science Carnegie Mellon University, Pittsburgh, PA, Sep. 1, 1998.*
Sougata Mukherjea and Yoshinori Hara, "Focus+Context Views of World -Wide Web Nodes," C&C Research Laboratories, NEC USA Inc., 1997 ACM.*
Inderjeet Mani and Eric Bloedorn, "Sumilarities and Differences Among Related Documents," The MITRE Corporation, USA, 1999.*
Chaomei Chen, "Structuring and Visualising the WWW by Generalised Similarity Analysis," Department of Computer Science, Glasgow Caledonian University, UK, 1997 ACM.*

* cited by examiner

*Primary Examiner*—Tadesse Hailu
(74) *Attorney, Agent, or Firm*—Schiff Hardin LLP

(57) ABSTRACT

A device and method for searching or navigating in documents which are connected by links displays symbolic representations of these documents on an output unit, where a starting document is used as a reference and other documents are given a marker indicating the degree of similarity to the starting document according to a measure of similarity.

17 Claims, 1 Drawing Sheet

SEARCH AND NAVIGATION DEVICE FOR HYPERTEXT DOCUMENTS

BACKGROUND OF THE INVENTION

1. Field of the Invention

The present invention relates to navigation and searching in documents which are connected by links and are most commonly referred to as hypertext documents.

2. Description of the Prior Art

Documents connected by links are usually referred to as hypertext documents. One example of a hypertext document format that is commonplace and widely used on the Internet is the hypertext markup language (HTML) format. Another example of a hypertext document format is that used by the help files contained in the graphical user interface "WINDOWS" sold by the Microsoft Corporation. The term "HTML pages" used below should be construed as encompassing all forms of hypertext documents.

Although searching for information by navigating through the hyperlinks of hypertext documents represents a vast improvement over searching through traditional documents with their hierarchical chapter structure, additional aids to searching and navigating are necessary. These aids include an index which links the search words to their corresponding pages.

Other known aids include "search engines". These are queried using one or more relevant words which are applied to a precompiled and continuously updated index which is usually very comprehensive but not directly visible. The search engines then display links to a number of documents in which these relevant words are mentioned.

A number of options are available for compiling this index from HTML documents. The index may be compiled from: 1) relevant words using the META tag, 2) text contents of other tags, in particular, the "TITLE" tag, or 3) the contents of the entire text. The option chosen depends primarily upon the amount of data to be indexed in relation to the operating resources available.

For search engines, the correct choice of search words is of crucial importance for a good search result, but search engines do not take into account nor represent the relationship of relevant documents. Thus, during a search, an individual may find a hypertext page that is reasonably close to containing the desired information, yet that individual will then have to systematically search back and forth through the links and manually inspect the hypertext pages in order to find the desired information.

A tree is used to represent the basic structure of hypertext pages because each page appears as nodes with links to subordinate nodes, although back links and cross links critically interfere with this structure. One navigation aid, known as a site map, displays a structure tree of the hypertext documents. The site map starts with a reference page, which is usually referred to as the home page, and constructs tree roots—the site map suppressing (or displaying as unhighlighted) all links conflicting with the tree structure. A number of other two-dimensional graphical representation forms are known, and, more recently, three-dimensional images have been utilized, which the user can interactively rotate and project onto a two-dimensional display surface. Yet a disadvantage with these representations is that they are only labeled with a short text string, usually the defined title. Although this navigation is clearer than if the user constructs this tree in his memory or writes it down on paper, the user nevertheless still has no help as to which of the nodes might have the greatest relevance. Furthermore, the usefulness of a search engine and associated index is contingent on the appropriate choice of relevant words to be searched.

SUMMARY OF THE INVENTION

It is an object of the present invention to provide a device which, starting from a known hypertext document, automatically displays other related documents without the user having to extract search words from the content of the starting document in order to initiate an index or full-text search. The above object is achieved in accordance with the invention in an apparatus and method wherein a symbolic representation of a starting document and of the documents connected to it, along with the degree of similarities of the linked documents are displayed.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

DESCRIPTION OF THE PREFERRED EMBODIMENTS

Figure 1:
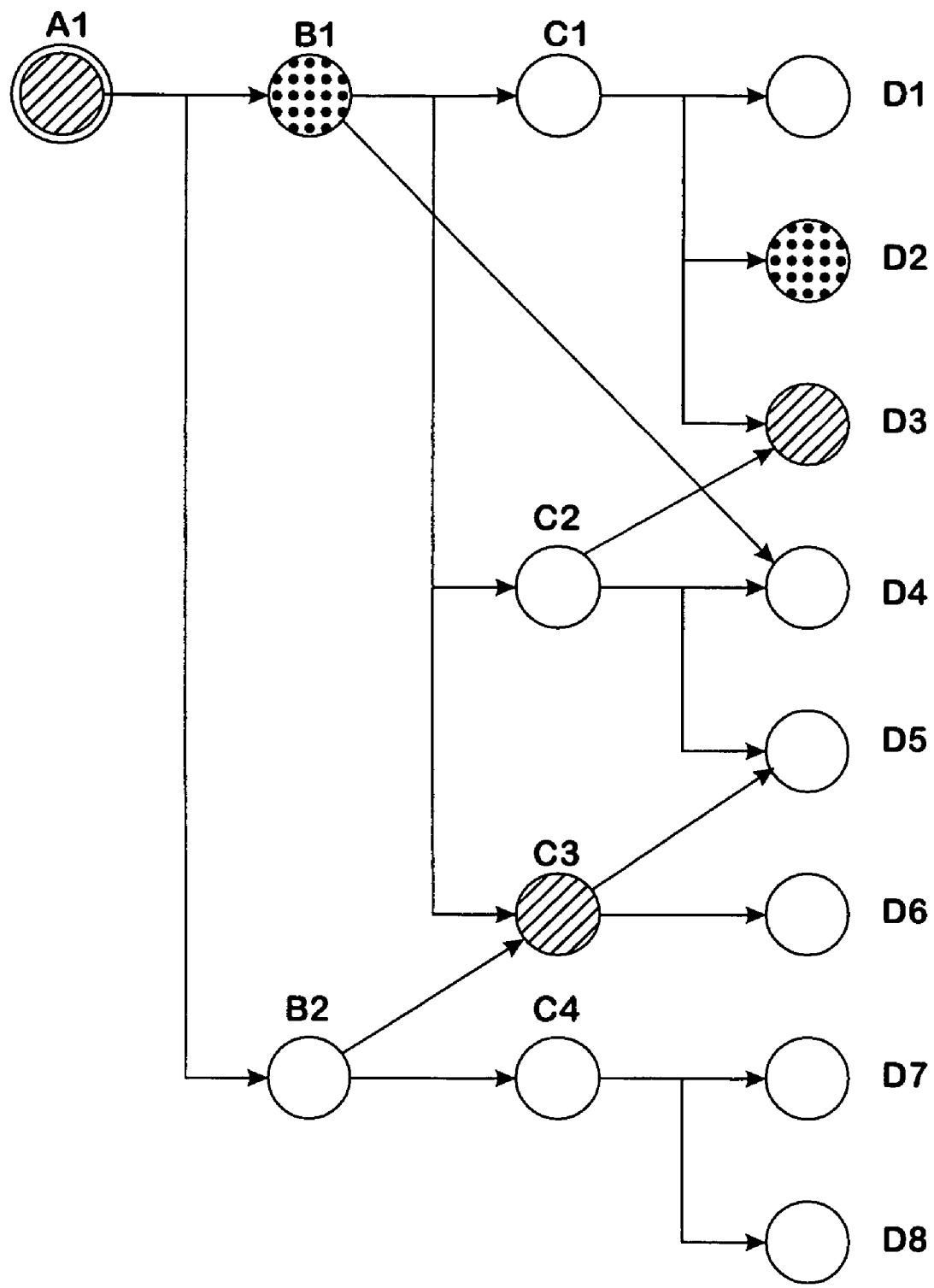
FIG. 1 is a diagram showing the image displayed by the device.

In the preferred embodiment, the device consists of a computer with a graphical display and known input units such as mouse and keyboard. The graphical display is preferably run with the program packages X/Windows, JAVA, an operating system ending in "IX", etc. It is also possible to use Microsoft Corporation's Windows-based operating systems.

A hypertext document containing hypertext links (links), preferably stored in HTML format, is shown on the graphical display, using a program called a browser which utilizes the HTML format instructions for presentation. An extra function, beyond those of the browser, is provided to the user through a JAVA application or other separate program written in a suitable program language. This function or program takes an address, or URL, of the starting document as a parameter, and uses the links contained within the starting document to access other documents referenced by those links. This procedure is then recursively repeated for these other documents.

Since the link structures of hypertext documents do not necessarily represent a tree, a restriction of the search level is necessary. This may be done by specifying: 1) the number of recursion levels to be used, 2) the number of documents to be searched, 3) the amount of time used, 4) a scope limitation on the domains or addresses searched, or 5) a combination of the preceding.

FIG. 1 shows an essentially tree-like representation, as could be found as the result of a recursive downward path in four planes, including the starting document A1 according to the prior art. The documents are represented as circles and the links as arrows. The shading of some circles constitutes a part of the invention that is not present in the prior art. As can be seen, document A1 contains two links to documents B1 and B2; B1 links to C1, C2, C3 and D4; B2 links to C3 and C4; C1 links to D1, D2 and D3; C2 links to D3, D4 and D5; C3 links to D5 and D6; and C4 to D7 and D8.

Since the documents need to be loaded into the device in order to determine the links contained in them, processing is carried out for each newly loaded document. To process these documents, the words in the document are extracted and assessed in terms of their frequency, ignoring irrelevant word types such as articles, conjunctions, and other stop words; the processing also may utilize some form of a dictionary to implement only basic forms of words for heavily inflected languages.

A basic frequency assessment simply approximates the number of word occurrences in the document. An improved variant may also account for the position of each word occurrence; for example, words in the title or the list of relevant words may be assessed with a higher weight so that the frequency appears as a fraction. Normalization to the total number is also possible. These frequencies may be arranged in a matrix which grows with the number of documents investigated, where the rows are the documents indexed and the columns are the words indexed.

Using this matrix, a distance between two documents can be determined by multiplying two column vectors and taking the sum of the products. The greater this distance between two documents is, the more similar the two documents are; this distance is particularly large if the documents have many common words which also occur with similar frequencies in both documents. The first proposals in this direction were made by H. Luhn in the article "The Automatic Creation of Literature Abstracts", IBM Journal of Research and Development 2, 158–165, 1958. Other functions which use the matrix or extract a square symmetric matrix of the distance of the documents from one another from the matrix, by determining distances in pairs and thereby eliminating the words, are likewise possible. The choice of functions may be made on pragmatic grounds and is unimportant to the basic functionality of the invention, even though success in applying it may depend on the functions used. The distance measure does not correspond to the criteria of a topological distance, since the triangle inequality need not be satisfied and the distance from one document to itself gives a maximum value instead of zero.

The use of word frequency vectors is advantageous to the extent that the matrix of the weighted word frequencies can be made dynamically during the recursive searching, and each document needs to be transmitted and analyzed only once. This does not, however, preclude the possibility of running the device in such a way that a distance measure is re-determined each time by currently loading and evaluating the relevant documents. It is also possible to have a combination in which the determination via word frequencies determines a preselection of documents for which the distance measure is then accurately determined in pairs using other methods, which require the document text itself. As mentioned above, this could be the case with heavily inflected languages or the like, in which the procedure of reduction to word stems requires an elaborate syntax and semantic analysis.

The link structure is preferably displayed after the search procedure has been completed and the matrix has been compiled. A large number of forms are known for displaying the link structure, such as a list of entries, a tree-like graphical representation or elaborate 3D/2D representations. In all customary representation forms, the foreground contains a tree structure as is canonically created in a recursive downward path. The links not corresponding to the tree structure are then either not shown or are represented as extra lines, where appropriate in unhighlighted form. As 3D/2D representation, various formats are known in which the structure is first built up as a graphic in a three-dimensional space and then projected onto a two-dimensional surface, such as a fisheye view.

FIG. 1 shows one such greatly simplified representation, in which color is represented by shading. Document A1 is the starting document and is specially labeled here by a double border. Since this is also the starting point of the document similarities, it has the same shading as the two documents D3 and C3 most similar to it. The two next most similar documents B1 and D2 are represented as dotted.

Regardless of the representation used, the invention relates to the fact that the distance from the starting document, determined through the matrix or in a different way, is displayed by the symbols in the structure representation. Color is preferably used because it does not have any essential role in known representations. For example, the following colors could be used to represent the greatest to the least degree of similarity respectively: red, green, yellow, blue, and black. Gray scales represent another type of coloring that could be used with a display having a light background: white might be preferably used to denote low significance and black to denote the greatest similarity.

A symbol size might likewise be equivalent to a color for representing degree of similarity; for this reason, "color" in the claims is also intended to cover gray scales as well as other scalable representations such as the diameter of a circular surface. Size is not useable as a "color" only in the case of 3D/2D representations, in which it is desired to have a perspective reduction through the projection in order to view the position in space. It is further possible to use shape as a "color" because a triangle is a substantially more significant representation and clearly distinct from a square (although the difference between a hexagon and a heptagon may be hard to see). Nevertheless, the number of vertices could also represent a "color"; this could be important for users with reduced visual capacity in the area of chromatic colors who may be better able to discriminate shapes. The use of shapes may also be combined with a chromatic color representation.

If the distances and colors of the symbols are defined, then one could give special emphasis to the document closest to the starting document. One might utilize a fully or partially flashing symbol, such as a flashing yellow circumference where the symbols are circular surfaces and a dark color signals greater similarity than a light color.

Since the symbols all appear on the interface, it is also possible for a symbol which is not yet the starting document to be made the new starting document using an input instrument (e.g., a mouse). In the preferred embodiment with data already accumulated in matrices, the new coloring of the representation can then rapidly be determined and displayed. Preferably, in this case, a new downward path from the new position is not run through, and the data already accumulated are used instead. In the case of corresponding operating means, however, it is expedient to add the documents which are still missing and have been moved into range by the new reference point; this may, if appropriate, be done as a background process which then brings the display to the possibly altered state on request.

Since the words are still available as lists in the embodiment described above (the matrix representation of words and documents), the words are still available as lists and the user may be provided with these as a further selection criteria. Alphabetic sorting or sorting on the basis of frequency is possible as well. If the user selects one or more words, then the document giving the best match to the selection becomes the starting document. Functionally, a virtual document which comprises the maximum word frequencies of the selected words then becomes the starting document.

Unlike an indexed search, the above procedure does not cause an altered graphical arrangement of the displayed structure, but merely changes its coloring. Another embodiment also uses, preferably in addition to color, the distance of the symbols from one another in 3D-space as a "color feature". 3D representations, in particular, still leave considerable latitude in the relative distance of the symbols from one another. However, since the measures used do not, as mentioned above, represent a metric, such an image is not uniquely defined. Through an iterative procedure, however, it is possible to bring about a deformation which clearly displays the relative proximity of various documents. The fact that the display is not static, but instead continuously changes slightly because of the conflicting effects, can be tolerated here. Moreover, this "breathing" is suitable for representing the relative uncertainty of the classification better than a "frozen" image which pretends to simulate a final arrangement which is not stable at all.

Although modifications and changes may be suggested by those skilled in the art, it is the intention of the inventors to embody within the patent warranted hereon all changes and modifications as reasonably and properly come within the scope of their contribution to the art.

I claim as my invention:

1. A device for navigating documents connected by links, comprising:
   a computer which comprises a graphical display, the computer being configured to operate according to a program that displays document symbols representing the documents and link symbols representing the link relationship of the documents;
   wherein a similarity measure between a starting document and each other document is calculated, and wherein the document symbols are augmented by a marking dependent on the calculated measure of similarity.

2. The device of claim 1 further comprising a storage area which holds characteristic vectors, each extracted from respective said documents, said characteristic vectors being utilized in calculations to produce said measure of similarity without referring back to respective said documents.

3. The device of claim 2 wherein said storage area holds a quantity of said characteristic vectors, wherein said quantity and selection of said documents is determined both by predefined limiting criteria and by tracing said links within said documents.

4. The device of claim 1 wherein said measure of similarity is determined by a weighted function over the frequencies of words in common in said documents to be compared.

5. The device of claim 1 wherein said symbol configurations represent said degree of similarity.

6. The device of claim 5 wherein said symbol configurations utilize color to represent said degree of similarity.

7. The device of claim 5 wherein the relative arrangement of said symbols is modified such that the distance between any said symbol representing any said other document and said symbol representing said starting document is related to said measure of similarity by a known mathematical function.

8. The device of claim 1 wherein said input device is utilized by an individual to select said symbol which determines said starting document.

9. The device of claim 1 wherein said input device is utilized by an individual to generate a selection of words wherein said starting document is determined by a maximum frequency of said selection of words within said documents.

10. A method of displaying documents connected by links on a computer device, comprising;
    providing a graphical display of the computer device;
    displaying document symbols, using a computer program, that represent the documents and link symbols representing the a link relationship of the documents;
    calculating a similarity measure between a starting document and each other document; and
    augmenting the document symbols by a marking dependent on the calculated similarity measure.

11. The method of claim 10 wherein said step of calculating said measure of similarity is comprised of the steps of:
    generating characteristic vectors from each of said documents;
    storing said characteristic vectors in a storage area in said computer device; and
    utilizing said characteristic vectors in calculating said measure of similarity without referring back to respective said documents.

12. The method of claim 10 wherein said step of determining said operative group of documents is comprised of the steps of:
    tracing said links within said starting document to find and acquire newly found documents; and
    iteratively tracing said links within said newly found documents to find and acquire additional newly found documents according to a predefined limiting criteria.

13. The method of claim 10 wherein said measure of similarity is determined by a weighted function over the frequencies of words in common between said starting document and said remaining documents within said operative group.

14. The method of claim 10 wherein said step of displaying respective symbols and symbol characteristics comprises the steps of:
    choosing a color to represent said degree of similarity; and
    displaying said symbols in the chosen color.

15. The method of claim 10 wherein said starting document is determined by selecting one of said symbols by an individual with said input device from a previously determined operative group.

16. The method of claim 10 wherein said starting document is determined by the steps of:
    generating a selection of words by an individual with said input device from a previously determined operative group; and
    determining a starting document from a previously determined operative group based on a calculation of a maximum frequency of said selection of words within a document within said operative group.

17. The method of claim 10 wherein said step of displaying respective symbols and symbol characteristics comprises the steps of:
    calculating a physical display location at a distance away from said symbol of said starting document which is related to said measure of similarity for each said remaining document in said operative group by a known mathematical function; and
    displaying each said remaining document in said operative group at said calculated physical display location.

* * * * *